United States Patent [19]

Green

[11] Patent Number: 4,624,578

[45] Date of Patent: Nov. 25, 1986

[54] RENTAL CONTRACT TIMER SYSTEM

[76] Inventor: David L. Green, 18340 Cutlass Dr., Ft. Myers Beach, Fla. 33931

[21] Appl. No.: 803,218

[22] Filed: Dec. 2, 1985

[51] Int. Cl.⁴ .............................................. G04B 47/00
[52] U.S. Cl. .................................... 368/10; 340/309.15
[58] Field of Search ........................... 368/10, 107–109; 340/309.15; 364/143–145, 569

[56] References Cited

U.S. PATENT DOCUMENTS

| | | | |
|---|---|---|---|
| 3,871,502 | 3/1975 | Critchfield | 368/262 |
| 3,969,886 | 7/1976 | Yoda | 58/23 R |
| 4,301,524 | 11/1981 | Koepp et al. | 368/261 |
| 4,451,158 | 5/1984 | Selwyn et al. | 368/63 |
| 4,455,093 | 6/1984 | Bowen et al. | 368/10 |
| 4,495,484 | 1/1985 | Kawakatsu et al. | 340/52 R |
| 4,504,716 | 3/1985 | Sakamoto | 219/10.55 B |

Primary Examiner—Vit W. Miska
Attorney, Agent, or Firm—Charles J. Prescott; Raymond H. Quist

[57] ABSTRACT

Rental equipment such as television sets are provided with a timer which operates a relay to connect power to the equipment only during the time for which rental has been paid. The timer includes a magnetic reader head and decoder to produce digital signals corresponding with a magnetic strip which has been encoded with rental period and identifying information at the location where the rent is paid. The timer contains a real-time clock and a microprocessor to compare the current time with the time in the rental period. A power supply for the timer derives energy from the same power lines used for the rental equipment, but a battery is also provided to power the clock alone when the power supply is not energized. Displays of the current time and rental expiration time are provided, as well as visible and audible alarms to warn of the approach of the end of the rental period.

20 Claims, 6 Drawing Figures

RENTAL CONTRACT TIMER SYSTEM

BACKGROUND OF THE INVENTION

1. Field of the Invention

This invention relates generally to a system which permits operation of rental equipment only during the period for which rent has been paid, and more particularly to a system in which the rental period is encoded on a card at one location and decoded by an enabling-/disabling control on the rented equipment.

2. Description of Related Art

The owner of rental equipment such as furniture, appliances, etc. which is located in the premises of the lessee typically requires payment of the rental on a periodic basis, such as monthly. Often the owner or the owner's agent must actively seek payment of rental due by repeated telephone calls or the like. Although ultimately it is possible to retrieve the rented equipment if payment is refused, it may be impractical or impossible to collect unpaid rents. In addition, the owner does not wish to unnecessarily irritate the lessee when the rent has not been paid due to oversight, the lessee being away, etc.

In the past, arrangements have been used whereby a person prepays for use of a device or service by depositing payment in a timer attached to the device, or by purchasing a ticket permitting use to a particular destination. More modern arrangements encode a magnetic strip on a card giving the purchaser the right to make a particular number of copies on a copying machine for example. The rental of appliance types of equipment is somewhat different since the equipment is in the possession of the lessee and rent must be paid by the lessee whether the equipment is used or not.

U.S. Pat. No. 4,455,093, B. R. Bowen et al, entitled "Timer Mechanism for Rental Equipment", discloses a timer mounted on the rental equipment which runs only while the rented equipment is actually being used. A key is used to reset the timer, so that the equipment must be returned to the owner in order to get additional time. This arrangement is not practicable for large rental equipment.

SUMMARY OF THE INVENTION

A control, such as a relay, is installed on the rental equipment so that it can connect and disconnect the electric power supplied to the equipment. A contract timer receives encoded information contained on a card having a magnetic strip or the like specifying the end of the contract time period for which rental has been paid. The time is compared to the current time, and when the contract time period expires, the relay opens the power supply circuit. Power interruption may be avoided by paying the rent for a new contract period and receiving a new encoded card. Warning lights and alarms are included to advise the lessee of the approach of the end of the rental period.

It is therefore an object of this invention to provide an enabling and disabling control which can be installed in rental equipment to be located on a leasee's premises.

It is a further object of this invention to permit programming of the enabling and disabling control by an encoded medium which can be encoded at another location upon payment of the required rent.

It is also an object of this invention to provide on the rental equipment visual and audible alarms advising of the approach of the end of the contract rental period.

In accordance with these and other objects which will become apparent hereinafter, the invention will now be described with reference to the accompanying drawings.

DETAILED DESCRIPTION OF THE INVENTION

Figure 1:
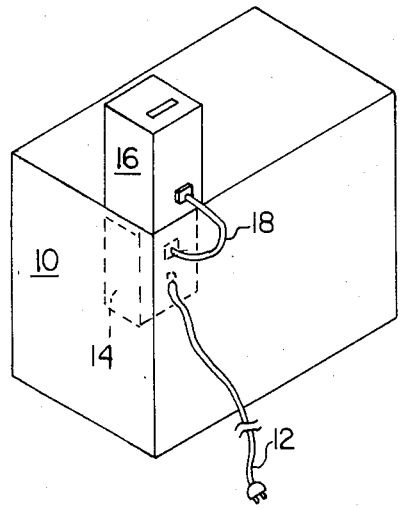
FIG. 1 represents a piece of rental equipment having control and display modules in accordance with the invention mounted thereon.

Referring to FIG. 1, rental equipment 10 represents any one of the various types of equipment with which the present invention may be used such as a television set, video cassette recorder, refrigerator, etc. Rental equipment 10 has been slightly modified by having its power line 12 interrupted by control module 14. Control module 14 is preferably installed within the cabinet of the rental equipment as shown, to discourage tampering, but it may also be mounted on the exterior of the equipment cabinet. Power line 12 extends into control module 14 where it is connected to a switching device, and then extends from control module 14 so that it may be plugged into an electrical receptacle. Display module 16 is shown positioned on top of rental equipment 10 and is electrically connected to control module 14 by line 18. Display module 16 could be made mechanically integral with control module 14 as well as being a separate component, as shown.

Figure 2:
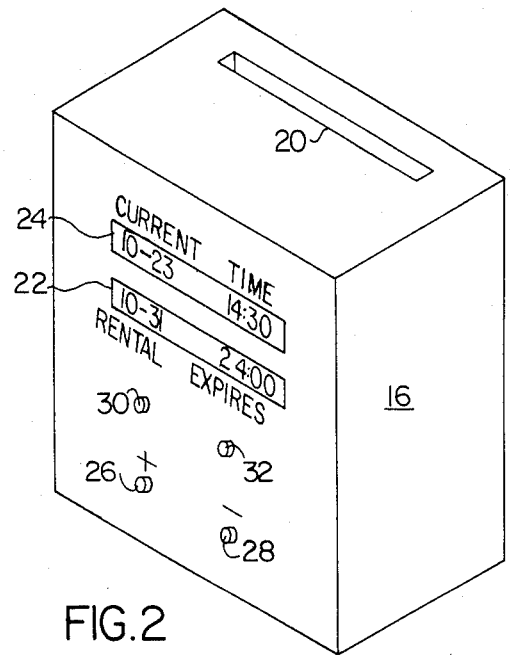
FIG. 2 shows the exterior of the display module in more detail.

FIG. 2 shows display module 16 in more detail. Slot 20 is provided on the top of display module 16 wherein an encoded card, or the like, may be inserted. The card is encoded by the owner of the equipment at the time the rent is paid, and contains information such as the date and time of the expiration of the rental period. This expiration date and time is displayed in display panel 22 of display module 16. Display module 16 also has display panel 24 which displays the current date and time. Display module 16 also includes plus switch 26 and minus switch 28. Switches 26 and 28 are enabled by specially encoded cards carried by agents of the equipment owner. One such agent would be a collection agent who goes to the premises of the lessee. After collection of the rent, the agent will insert his specially encoded card into slot 20 and manually set the new expiration time and date. Another such agent would be a repair man who goes to the premises of the lessee to repair the equipment which has been rented or the display or control module. Also shown on the face of display module 16 are indicator lights 30 and 32 which may be green and red light emitting diodes.

Figure 3:
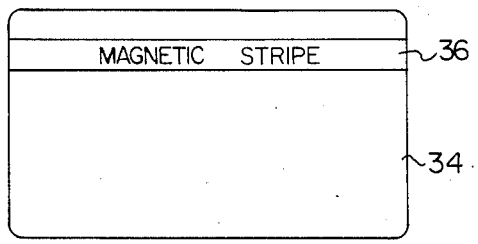
FIG. 3 represents a magnetic stripe card which can be employed in carrying out the invention.

Turning next to FIG. 3, a magnetic stripe card 34 is shown. Magnetic stripe card 34 is of the customary type, formed of paper or plastic and having a strip of magnetic material 36 thereon. Magnetic stripe card 34 is inserted by the lessee into slot 20 of display module 16 on the rented equipment so as to enter the new expiration date. Generally, a separate magnetic stripe card 34 will be used for each piece of equipment. Also, the information encoded on the card will be removed when it has been inserted in the display module as a security measure. Preferably, the encoded data consists of an authenticity code to verify that the card is genuine, a service code to indicate the purpose of the card and contract time data.

Figure 5:
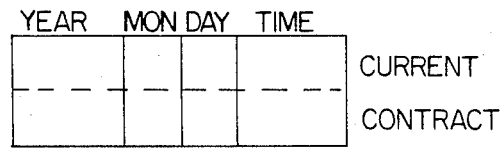
FIG. 5 shows the display of the encoding device of FIG. 4 in more detail.
Figure 4:
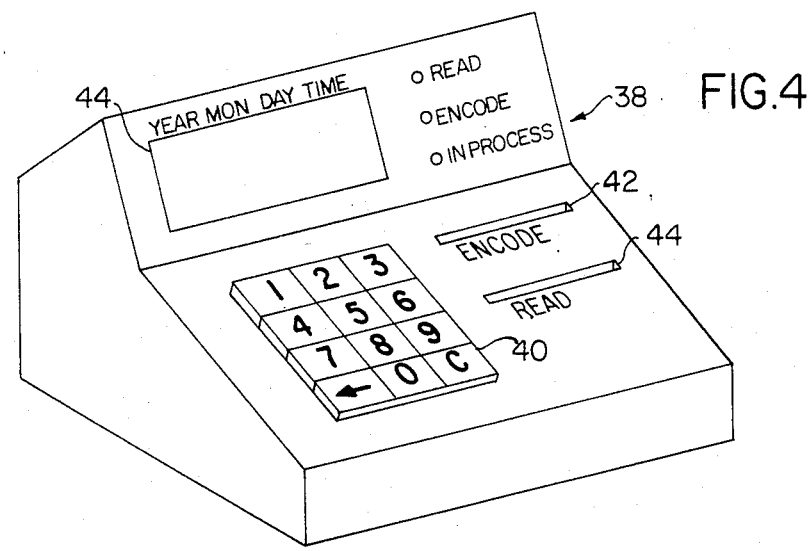
FIG. 4 represents the type of encoding device which can be used to enter encoded data on the card of FIG. 3.

FIG. 4 represents a typical encoding device 38, similar to that produced by Elcom Industries, Inc. Keyboard 40 permits manual encoding of the data on a card having a magnetic strip which has been inserted in slot 42. Display 44, as shown in more detail in FIG. 5, provides two rows of data. The upper row displays the current date and time; while the lower row displays the particular contract expiration data as it is encoded. It will be evident that the particular data used and the manner of encoding it, i.e. the cryptographic form, are optional and may be varied in accordance with the desires of the equipment owner. Slot 44 is also provided on encoding device 38 to permit reading of an encoded card.

Figure 6:
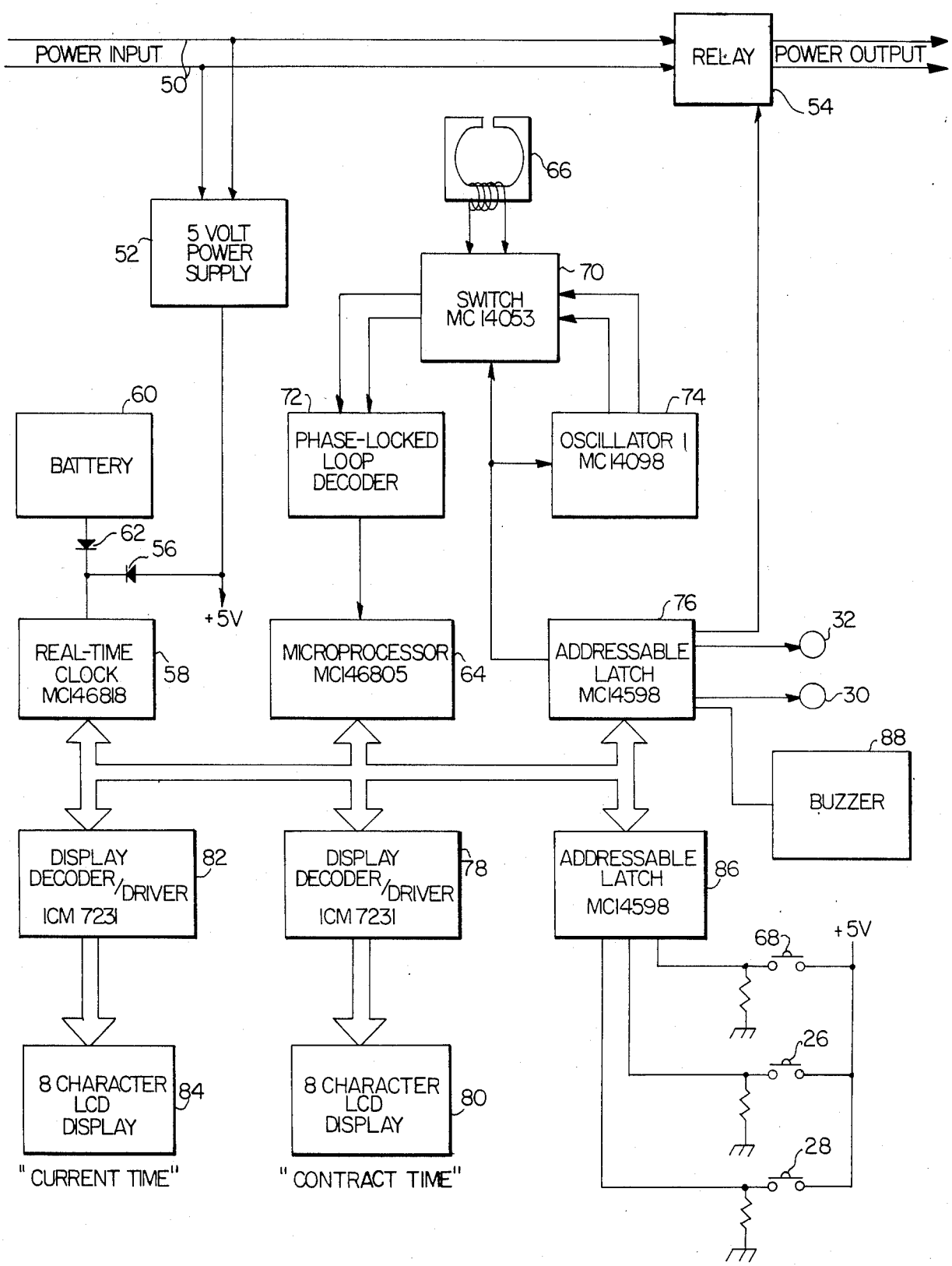
FIG. 6 is an electrical schematic of the components contained in the display and control modules of the invention.

FIG. 6 portrays the circuitry for the display and control modules in one form. The rental equipment electrical power is conveyed on lines 50 which enter control module 14 (FIG. 1) which contains power supply 52 and relay 54. A relay is shown, however, other switching devices such as solid state switches might also be used. Power supply 52 is connected across lines 50 and contains a transformer and rectifier to provide five volts to the components of display unit 16. Power supply 52 is connected through diode 56 to real-time clock 58. Battery 60 provides an alternate source of power providing at least 3 volts. Power will not be drawn from battery 60 through diode 62 as long as the voltage supplied by power supply 52 exceeds that of battery 60. Thus only when power lines 50 are disconnected from a power supply, whether accidentally or deliberately, will power be drawn from battery 60. The lower voltage of battery 60 causes clock 58 to enter a quiescent state in which it continues to count time, but no display is available. The contract expiration time is also retained while the unit is under battery operation.

Relay 54 within control module 14 controls the transmission of power to the rental equipment and will disconnect power from the rental equipment at the end of the period for which rent has been paid.

It will be recognized that one need merely bypass control module 14 to provide power to the rental equipment without paying the rent; however, this would require removing the back panel of the equipment. It is not the purpose of the present invention to thwart a thief, but rather to encourage a slow or lazy payer to make a prompt rental payment. Failure to pay the rent will, of course, be evident, and if it is not paid within a reasonable period, the equipment may be reclaimed.

Clock 58 is a Motorola MC146818 real time clock having an internal memory in which the contract expiration time can also be stored. The output of clock 58 is read by microprocessor 64. Microprocessor 64 is a Motorola MC146805 single chip microprocessor. Microprocessor 64 also decodes the data from magnetic stripe card 34 (FIG. 3). This data is initially received by magnetic reader head 66 which is a typical tape recorder reading head. In the embodiment built, the data contained an authenticity code to verify that the card was genuine, a service code to indicate the purpose of the card and the contract period termination time (time including the date). When the magnetic stripe card 34 is inserted into slot 20 of display module 16, switch 68 is moved to the closed position. Microprocessor 64 determines from this switch closure that a card is in reader head 66. As the magnetic strip of the card passes across the gap of reading head 66, the changing magnetic flux induces voltages which go through switch 70 to decoder 72. Switch 70 is a Motorola MC14053 multiplexor which connects the reading head to the decoder as the card is inserted and connects oscillator 74 to the reading head as the card is withdrawn in order to erase it. Decoder 72 is a phase-locked loop decoder, and oscillator 74 is a Motorola MC14098 monostable multivibrator. Decoder 72 converts the analog voltage to a digital voltage and sends the resulting signal to microprocessor 64.

Microprocessor 64 evaluates the data provided on the card, first by verifying authenticity of the card, and then separating the information into contract time data and service code data. If the service code indicates a contract card (service code 3 in the system conceived) the time data is compared to the current time and, if the time data is later than the current time, the time data is considered to be contract time. After receiving the data, microprocessor addresses latch 76 to turn on the bit which causes switch 70 to connect oscillator 74 to reading head 66. (This is to perform the previously referred to erasing of the magnetic strip as the card is withdrawn.) Latch 76 is a Motorola MC14598 addressable latch. The microprocessor can control each output individually and uses this chip to turn indicators and other functions on or off. When microprocessor 64 determines that switch 68 is open (indicating that the card has been totally removed) the microprocessor turns off the oscillator control bit and processes the contract time data.

The contract time data is stored both in the random access memory of real-time clock 58 and in the memory of the microprocessor. The contract time data is also sent to the display driver 78. Display driver 78 is an Intersil ICM7231 Display Decoder/Driver. Display driver 78 sends the information to the eight character liquid crystal display 80 (FIG. 2, reference 22) where it is displayed as the "Rental Expires" data. In lieu of the preferred liquid crystal display, a light emitting diode display may be substituted.

The microprocessor then turns on the green light emitting diode indicator light 30 and energizes relay 54 thereby applying electrical power to the rental equipment.

If electrical power has been interrupted and resumes, microprocessor 64 reads the current time in real-time clock 58 and loads that information into the display driver 82 which sends the information to the eight character liquid crystal display 84 (FIG. 2, reference 24) where it is displayed as the "Current Time" data. The microprocessor also checks the memory in the real-time clock to determine if a contract time has previously been entered.

Microprocessor 64 also stores data into addressable latch 76. One bit is used to turn on indicator light 32, a red light emitting diode which indicates that the timer is operating. The microprocessor then begins its normal routine of checking real-time clock 58 and updating the current time display. It also compares the current time with the contract time expiration. If the contract time expiration arrives before it is extended, or if there is no contract time set (such as in a first use situation) the microprocessor turns off the other bit functions of addressable latch 76. It also periodically checks the condition of switch 68 through addressable latch 86. Addressable latch 86 is a Motorola MC14598 addressable latch.

Another part of the normal routine of microprocessor 64 is to provide warnings of the approach of the end of the contract time period. If microprocessor 64 determines that there is less than two days of contract time remaining, it flashes indicator light 30 at a rate of once per second. If the contract time is less than one day, indicator light 30 is flashed at a rate of twice per second and, in addition, if the current time is exactly at the hour (00 minutes and 00 seconds) the buzzer 80 is energized for 1 second. These visible and audible indicators serve as a notification of the impending termination of the contract.

If microprocessor 64 receives and indication that a card having service code 1 has been inserted in slot 20 of the display module (an indication that the card holder is an agent of the owner who is a repair or service man) or a card having service code 2 (an indication that the card holder is an agent of the owner who is a collection agent) it will check the status of switches 26 and 28. If switch 26 is being closed (while a card with service code 1 is inserted) the current time will be advanced. If switch 28 is being closed (while a card with service code 1 is inserted) the "Current Time" display will be decremented. If the card has service code 2, closing switches 26 and 28 will advance or decrement respectively, the "Rental Expiration" display. These switches are only checked while the card is in the reader. The oscillator is not energized, so the cards are not erased when removed.

The invention lies in installing a control device on a rental appliance, preferably in such a manner as not to void any warranty on the appliance. The control device is intended to encourage the lessee of the appliance to pay the next rental payment promptly and most likely before the end of the current rental period so that no lapse in use of the appliance occurs. The timer prevents the rental period from being extended by unplugging the appliance because its self contained battery continues to operate the clock and keep the rental period in memory. Even if a lessee fails to pay the rent, the equipment owner still has recourse to the traditional remedy of reclaiming the equipment.

The invention also provides for servicing of the equipment by an authorized agent of the owner, and will permit manual setting of the rental expiration by an agent of the owner at the premises of the lessee even if a magnetic strip encoder is not available.

The invention as heretofore described provides only one way of carrying out the invention. It may be desired to provide a display which will count down the hours remaining in the rental period and to use an encoding means other than a magnetic strip for enabling the timer control. Even the same functions described may be accomplished by different circuit arrangements.

Although a rental contract timer system in accordance with the invention has been illustrated and described, it will be apparent to those skilled in the art that modifications may be made. It is intended that the appended claims cover all such modifications falling within the spirit of the invention and the scope of the claims.

I claim:

1. A rental contract timer system for permitting the operation of rental equipment only during a rental period encoded on a medium which may be encoded at a remote location comprising:
   decoding means for decoding said encoded medium;
   switching means for putting said rental equipment in operable and inoperable conditions; and
   computer means for directing said switching means to put said rental equipment in operable condition only during the rental period as decoded by said decoding means.

2. A rental contract timer system in accordance with claim 1 wherein:
   the medium is a card having an encodable magnetic strip thereon containing an encoded description of the expiration time of the rental period;
   said decoding means is a magnetic reader head for producing analog electrical signals in response to magnetic field encoded information contained on said magnetic strip and a phase-locked loop decoder for converting said analog electrical signals into corresponding digital electrical signals;
   said switching means is a relay for connecting and disconnecting the supply of electrical power to the rental equipment; and
   said computer means is a microprocessor which compares the current time to the expiration time and directs said relay to connect the supply of electrical power to the rental equipment only as long as the expiration time has not arrived.

3. A rental contract timer system in accordance with claim 2 further including:
   an oscillator for producing a varying analog signal;
   switch means for connecting said magnetic reader head to said phase-locked loop or to said oscillator;
   a real-time clock;
   current time display means for displaying the time of said real-time clock;
   rental expiration display means for displaying the expiration time of the rental period;
   visible alarm means for warning of the approach of the expiration time;
   said microprocessor also directing said visible alarm means to flash when the expiration time is a first predetermined period away;
   audible alarm means for warning of the approach of the expiration time;
   said microprocessor also directing said audible alarm means to sound when the expiration time is a second predetermined period away;
   power supply means for providing 5 volt direct current to said timer system;
   battery means for providing a direct current of a voltage of at least three volts but less than that of said power supply to said real-time clock when said power supply means does not deliver 5 volt direct current;
   switch means having a first mode directed by said microprocessor permitting said real-time clock to be advanced and decremented, and a second mode directed by said microprocessor permitting said rental expiration display means to be advanced and decremented; and switch means for signaling said microprocessor that said card has been introduced in said magnetic reader head.

4. A rental contract timer system in accordance with claim 3 wherein:
said current time display means and said rental expiration display means are liquid crystal displays.

5. In a rental contract timer system wherein operation of rental equipment is enabled by a control thereon and said control is directed to enable operation for a rental period specified by instructions encoded on a medium which may be encoded at a remote location, an improved control comprising:
decoding means for decoding the instructions of the medium to determine the rental period;
switching means for putting the rental equipment in operable and inoperable conditions;
timing means to produce signals representing the current time; and
computer means for comparing the current time with the rental period and for directing said switching means to keep said rental equipment in operable condition only during the rental period.

6. A rental contract timer system as set forth in claim 5 having the improved control wherein:
said switching means for putting the rental equipment in operable and inoperable conditions is a relay having a switch for connecting and disconnecting the supply of electrical power to said rental equipment.

7. A rental contract timer system as set forth in claim 5 having the improved control further including:
display means for displaying time of rental expiration information.

8. A rental contract timer system as set forth in claim 5 having the improved control further including:
power supply means for providing power to said timer system derived from an external source of power; and
a battery providing power to said timing means when said power supply means is not operating.

9. A rental contract timer system as set forth in claim 5 having the improved control further including:
current time display means for displaying the time of said timing means; and
rental expiration display means for displaying the time of the end of the rental period.

10. A rental contract timer system as set forth in claim 5 having the improved control further including:
alarm means for warning of the approach of the rental expiration.

11. A rental contract timer system as set forth in claim 10 having the improved control wherein:
said alarm means is a visible alarm.

12. A rental contract timer system as set forth in claim 10 having the improved control wherein:
said alarm means in an audible alarm.

13. A rental contract timer for use in a system permitting the operation of rental equipment only during a rental period encoded on a medium which may be encoded at a remote location comprising:
a relay operatively connected to control the transmission of electrical power to the rental equipment;
a real-time clock; and
circuit means for comparing the time of said real-time clock with the rental period encoded on the medium and to direct said relay to transmit power to the rental equipment during the rental period and to not transmit power to the rental equipment after the expiration of the rental period.

14. A rental contract timer in accordance with claim 13 further including:
current time display means for displaying the time of said real-time clock; and
rental expiration display means for displaying the expiration time of the rental period.

15. A rental contract timer in accordance with claim 13 wherein:
the encoded medium is a magnetic strip and said circuit means includes decoding means for producing digital signals representing said encoded rental period.

16. A rental contract timer in accordance with claim 14 wherein:
the magnetic strip also includes encoded authenticity and service information and said circuit means will only respond to an authentic magnetic strip; and
said circuit means will permit manual adjustment of said real-time clock only with an authentic magnetic strip and proper service code.

17. A rental contract timer in accordance with claim 13 wherein:
said circuit means produces signals for predetermined times in advance of the expiration of the rental period for delivery to alarms on said timer.

18. A rental contract timer in accordance with claim 15 further including:
visible alarm means for producing visible alarms in response to received signals produced by said circuit means.

19. A rental contract timer in accordance with claim 15 further including:
audible alarm means for producing audible alarms in response to received signals produced by said circuit means.

20. A rental contract timer in accordance with claim 15 further including:
magnetic strip erasing means for erasing the magnetic strip after it has been decoded.

* * * * *